UNITED STATES PATENT OFFICE.

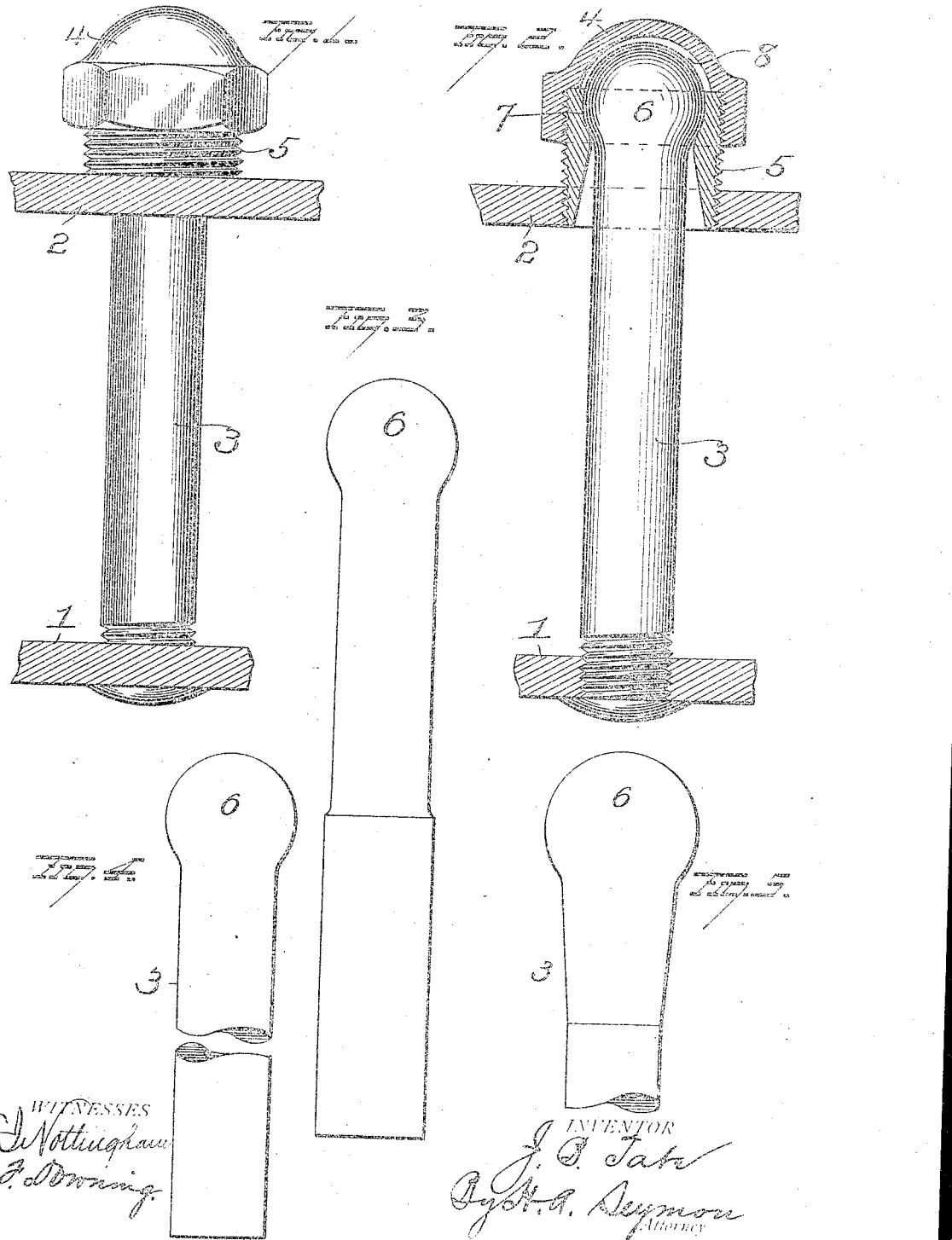

JOHN BRUCE TATE, OF ALTOONA, PENNSYLVANIA, ASSIGNOR TO FLANNERY BOLT COMPANY, OF PITTSBURG, PENNSYLVANIA.

STAY-BOLT.

No. 813,120.  Specification of Letters Patent.  Patented Feb. 20, 1906.

Application filed January 31, 1905. Serial No. 243,568.

*To all whom it may concern:*

Be it known that I, JOHN BRUCE TATE, of Altoona, in the county of Blair and State of Pennsylvania, have invented certain new and useful Improvements in Stay-Bolts; and I do hereby declare the following to be a full, clear, and exact description of the invention, such as will enable others skilled in the art to which it appertains to make and use the same.

My invention relates to an improved stay-bolt, and more particularly to flexible stay-bolts, the object of the invention being to improve upon the construction disclosed in Patent No. 753,329, granted to John B. Tate, March 1, 1904; and the invention consists in certain novel features of construction and combinations and arrangements of parts, as will be more fully hereinafter described, and pointed out in the claim.

In the accompanying drawings, Figure 1 is a view in side elevation. Fig. 2 is a view in longitudinal section thereof, and Figs. 3, 4, and 5 are views of various-shaped bolts.

1 represents the fire-box plate, 2 the outside or shell plate, and 3 a bolt connecting them. The plate 2 is made with a screw-threaded opening, into which an externally-screw-threaded sleeve or bushing 5 is located, and this sleeve or bushing 5 has a cap-nut 4 screwed onto its outwardly-protruding end. The outer portion of the sleeve or bushing 5 is made with a semispherical socket 7 to receive the partly-spherical head 6 of bolt 3, and the inner portion of the sleeve or bushing 5 is internally flared, permitting pivotal movement of the bolt in any direction. The inner face of the cap-nut 4 is partly spherical and substantially concentric with the spherical portion of the bolt-head, the construction being such that when the cap is in place a clearance-space 8 will be provided between the bolt-head and the partly-spherical surface of the interior of the cap. This clearance-space 8 between the spherical head of the bolt and the partly-spherical interior of the nut is of great importance, as it not only permits the pivotal movement of the bolt, even though more or less scale might collect in said clearance-space, but also permits of the expansion and contraction of the bolt, and thereby insures a free pivotal action of the bolt under all conditions of use. A great many sizes and shapes of bolt may be used, and I illustrate in Figs. 3, 4, and 5 some of such varying shapes. A series of bolts of different shape are all provided with the same-sized head to fit a single-sized sleeve or bushing and cap-nut, and for another series of bolts having a different-sized head a different size of sleeve or bushing and cap may be used, and for convenience each series of bolts with sleeve or bushing and cap are given a single designating letter or numeral or other character. The internal diameter of the sleeve or bushing at its narrowest point or neck is sufficiently large to provide clearance all around the bolt and permit the entrance of bolts of various sizes, thus allowing of the substitution of new bolts of larger size in the same sleeve or bushing for bolts which have become broken or otherwise damaged in use.

Slight changes might be made in the general form and arrangement of the parts described without departing from my invention, and hence I would have it understood that I do not restrict myself to the precise details set forth, but consider myself at liberty to make such slight changes and alterations as fairly fall within the spirit and scope of my invention.

Having fully described my invention, what I claim as new, and desire to secure by Letters Patent, is—

The combination with a stay-bolt, of a sleeve or bushing having a partly-spherical socket, an enlarged substantially spherical head on the bolt to fit the socket and project outwardly beyond the same, and a cap-nut on the sleeve or bushing having a partly-spherical inner surface substantially concentric with the bolt-head and constructed to provide a chamber or clearance-space between the head of the bolt and said partly-spherical surface in the cap.

In testimony whereof I have signed this specification in the presence of two subscribing witnesses.

JOHN BRUCE TATE.

Witnesses:
F. B. PATTERSON,
C. F. D. METZGER.